United States Patent
Herberth et al.

(10) Patent No.: US 10,254,117 B2
(45) Date of Patent: Apr. 9, 2019

(54) NAVIGATION DEVICE WITH TURNTABLE FOR INDEX MEASURING AND METHOD FOR OPERATING THE NAVIGATION DEVICE

(71) Applicant: NORTHROP GRUMMAN LITEF GMBH, Freiburg (DE)

(72) Inventors: Uwe Herberth, Hugstetten (DE); Uwe Probst, Freiburg (DE); Matthias Deck, Bad Krozingen (DE)

(73) Assignee: NORTHROP GRUMMAN LITEF GmbH (DE)

( * ) Notice: Subject to any disclaimer, the term of this patent is extended or adjusted under 35 U.S.C. 154(b) by 0 days.

(21) Appl. No.: 15/752,482

(22) PCT Filed: Jul. 20, 2016

(86) PCT No.: PCT/EP2016/067320
§ 371 (c)(1),
(2) Date: Feb. 13, 2018

(87) PCT Pub. No.: WO2017/029057
PCT Pub. Date: Feb. 23, 2017

(65) Prior Publication Data
US 2019/0011264 A1    Jan. 10, 2019

(30) Foreign Application Priority Data
Aug. 14, 2015    (DE) .......................... 10 2015 113 486

(51) Int. Cl.
*G01C 21/16*    (2006.01)
*G01C 25/00*    (2006.01)

(52) U.S. Cl.
CPC ............. *G01C 21/16* (2013.01); *G01C 25/00* (2013.01)

(58) Field of Classification Search
CPC ................................ G01C 21/16; G01C 25/00
See application file for complete search history.

(56) References Cited

U.S. PATENT DOCUMENTS

| 7,212,944 B1 | 5/2007 | Kohler et al. |
| 8,978,474 B2 | 3/2015 | Bottkol et al. |

(Continued)

FOREIGN PATENT DOCUMENTS

| CN | 101441171 A | 5/2009 |
| CN | 101763118 A | 6/2010 |

(Continued)

OTHER PUBLICATIONS

Chinese Office Action corresponding to Chinese Patent App. No. 201680047483.8, dated Sep. 11, 2018.

(Continued)

*Primary Examiner* — Anne M Antonucci
(74) *Attorney, Agent, or Firm* — Tarolli, Sundheim, Covell & Tummino LLP

(57) ABSTRACT

The invention relates to a navigation device comprising a turntable which can be rotated about an axis in at least two different rotary positions, in accordance with a rotary control signal. An inertial measuring unit is arranged on the rotary table which can be rotated with the rotary table. The quality of the measurement data can be determined by the initial measuring unit with the help of an evaluation device. When the determined quality does not reach a predetermined minimum quality, the rotary table rotates in the respective other rotary position.

8 Claims, 2 Drawing Sheets

(56) References Cited

U.S. PATENT DOCUMENTS

Figure 1:
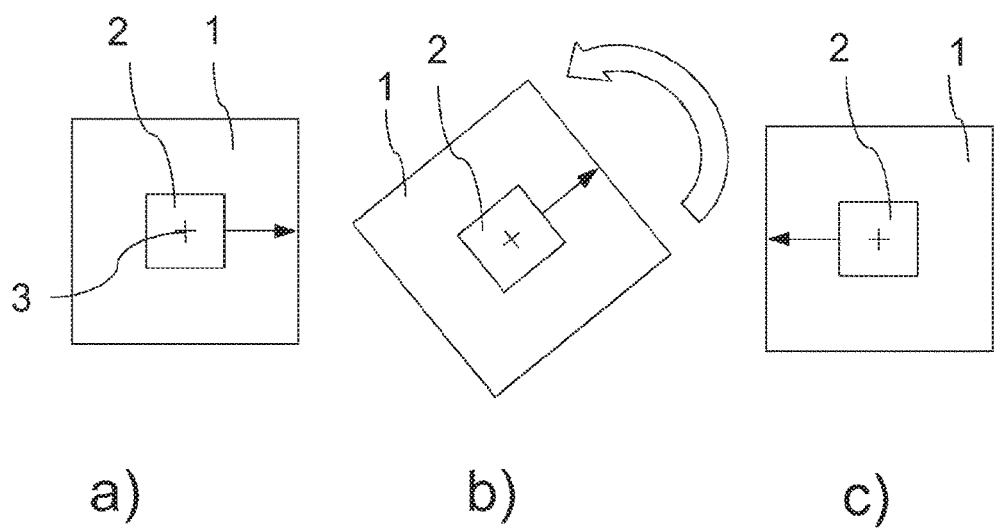

| | | |
|---|---|---|
| 2003/0084704 A1 | 5/2003 | Hanse |
| 2003/0236628 A1 | 12/2003 | Martorana et al. |
| 2005/0022402 A1 | 2/2005 | Ash et al. |
| 2007/0096979 A1 | 5/2007 | Hinnant, Jr. et al. |
| 2008/0319667 A1 | 12/2008 | Hawkinson et al. |
| 2010/0256907 A1 | 10/2010 | Bye |

FOREIGN PATENT DOCUMENTS

| | | |
|---|---|---|
| CN | 102749915 A | 10/2012 |
| CN | 103292809 A | 9/2013 |
| CN | 103597320 A | 2/2014 |
| DE | 2947863 C2 | 1/1985 |
| EP | 2239539 A2 | 10/2010 |
| GB | 2039674 A | 8/1980 |

OTHER PUBLICATIONS

Search Report corresponding to Chinese Patent App. No. 201680047483.8, dated Aug. 29, 2018.
International Search Report for corresponding International Application No. PCT/EP2016/067320, dated Oct. 18, 2016.

a) b) c)

NAVIGATION DEVICE WITH TURNTABLE FOR INDEX MEASURING AND METHOD FOR OPERATING THE NAVIGATION DEVICE

RELATED APPLICATIONS

The present invention is a U.S. National Stage under 35 USC 371 patent application, claiming priority to Serial No. PCT/EP2016/067320, filed on 20 Jul. 2016; which claims priority of DE 10 2015 113 486.1, filed on 14 Aug. 2015, the entirety of both of which are incorporated herein by reference.

The invention concerns a navigation device having a turntable suitable for a reversal measurement as well as a method for operating the navigation device.

For navigation of movable objects, e.g. in the field of shipping, there are fixed requirements to the navigation equipment as for example documented in IMO A.821. If the navigation equipment has an inertial sensor system (for example an inertial measuring unit), this sensor system has to be sufficiently efficient and precise, which leads to considerable costs.

For applications for which only a small budget is available, however, often the use of low priced navigation equipment is sufficient, which uses then necessarily a less precise sensor system. It has turned out that some of the sensor errors relevant for the navigation performance can be estimated and compensated by means of a reversal measurement and mathematical methods. In this manner, also by using more simple sensors, the required conditions of the norms can be satisfied.

However, according to the requirements to the navigation performance the reversal measurement has to be carried out frequently and in periodic, predefined time periods.

Typically, for the reversal measurement a mechanical turntable is provided on which the inertial measuring unit is arranged such that it is can be turned after predetermined time intervals together with the turntable. The turntable causes respectively opposite rotations (to and fro) around 180 degrees such that systematic measurement errors can be observed and compensated. Triggering of a rotation of the turntable can be performed manually or automatically.

Such a method for reversal measurements using a turntable is for example known from US 2010/0256907 A1. In this method the turntable is rotated e.g. regularly after time intervals, e.g. after every two minutes, around 180 degrees in opposite directions. The process of rotating takes 2 seconds.

Using the reversal measurement amongst others the so-called heading, i.e. the course or orientation of the object (e.g. of a ship) with respect to a reference system, can be determined with an increased precision. The navigation device may then in particular be used for a so-called "attitude heading reference system" (AHRS).

However, intensive use of the turntable, in particular during use of the navigation system during a longer time period, can lead to wearing or a deterioration of the mechanical, movable parts and therefore to imprecisions during mechanical rotation of the turntable, in particular with respect to the precision of the end or rotary positions. These imprecisions can lead due to the increasingly imprecise positioning of the turntable to an increase of navigation errors during the time of use as well as to a shortened lifetime of the whole apparatus due to lack of precision.

The invention is concerned with the problem of how to provide a navigation device that uses the method of reversal measurement and that allows an elongation of the lifetime of the apparatus while satisfying high quality requirements.

This problem is solved with a navigation device having the features of claim 1. A method for operating such a navigation device is indicated as further independent claim. Advantageous embodiments are defined in the dependent claims.

A navigation device is provided having: a turntable that can be rotated depending on a rotary control signal around an axis into at least two different rotary positions; an inertial measuring unit arranged on the turntable, which can be rotated together with the turntable; and having an evaluation unit for evaluating of measurement data of the inertial measuring unit; wherein the quality of measurement data can be determined by the evaluation unit, and wherein by the evaluation unit a rotary control signal can be generated, if the determined quality does not reach a predetermined minimum quality, such that then the turntable is rotated to the respectively other rotary position.

The inertial measuring unit can be abbreviated as IMU (inertial measuring unit). The IMU may be one or several rotation rate sensors, such as fiber optical gyroscopes (FOG), also in combination with one or several acceleration sensors. But typically, for use in connection with a reversal measurement a less expensive system is used such as for example a MEMS (micro electro mechanical system).

The inertial measuring unit is supported by the turntable that causes the respectively opposite rotations into the two different rotary positions, when a rotary control signal is generated. In particular, a rotation is carried out around a normal axis (yaw axis) or perpendicular to the local horizontal.

The evaluation unit is present in inertial measuring units anyways and serves inter alia for determining continuously or in periodic time intervals the quality of the measurement signals.

If it is determined that the quality does not reach the predetermined minimum quality, and that hence the quality of the measurement is questionable, a rotation of the turntable and hence of the inertial measuring unit around the rotation axis is triggered. The turntable is rotated together with the measuring unit for example around 180 degrees (or around a different angle) such that systematic measurement errors compensate and can also be corrected from the measurement signal by the evaluation unit by using calculations.

In difference to the prior art in which the rotations are carried out after regular, predetermined time intervals, it is considered according to the present invention to trigger rotations only then, if the decreasing quality of the measurement data makes this necessary. Due to this, in particular for new devices that do not show wearing yet, substantially larger time periods can be used without a rotation of the turntable. For older systems that have undergone a certain amount of deterioration already it is in contrast possible to increase the frequency of rotations due to monitoring the measurement quality or the quality of the measurement data such that the performance of the entire system can still be maintained over an extended time period by commanding a rotation, i.e. a reversal measurement, more often. A further increase of mechanical wearing of the mechanical components and increased power consumption must then be accepted.

Based on the inertial sensor data of the inertial measuring unit information such as the location, the position or the like are transferred to a higher level ship control. To this end, typically a platform calculation based on a Kalman filter is necessary. The filter may besides the inertial sensor data also use data of external sensors (such as for example GPS, Star Tracker or the like). If these data have a sufficient quality, then the quality of the inertial sensor data can be determined in a known manner.

If the quality of the inertial sensor data calculated in the Kalman filter is below the predetermined minimum quality the reversal measurement is triggered in order to reduce the inertial sensor error. Due to the fact that a reversal measurement is carried out only if needed and depending on the quality of the sensor data the number of reversal measurements is reduced. In this manner wearing of the mechanical turntable can be minimized, which causes an elongation of the lifetime of the device. In addition, lower power consumption can be achieved.

The quality of the measurement data can in particular be determined by using the variance of the measurement data. If for example a low variance of the measurement data is determined by the Kalman filter, a high quality will be indicated. If in contrast the variance is high, the quality of the measurement data will be low. The minimum quality is the defined as the maximally acceptable variance.

The quality of the measurement data may in addition also be determined based on other method step that are known per se, e.g. by a plausibility check of measurement differences.

The minimum quality may be a predefined fixed threshold. Alternatively, it is also possible that the minimum quality is a dynamic threshold that can be changed by the evaluation unit depending on further conditions.

Setting a dynamic threshold may e.g. be carried out depending on the respective operation modus or the vehicle dynamics. Also, the filter state (steady state, alignment) or the available data for the filter can be criteria according to which a dynamic threshold value is respectively set.

As already explained, it is advantageous if the rotary positions are offset with respect to each other by 180 degrees such that a forward rotation and a backward rotation are respectively opposite and amount to 180 degrees.

Just as well, it is, however, also possible to define other rotation angles which makes then according conversions of the measurement results necessary. In particular, the rotary positions can also be offset with respect to each other by an arbitrary angle.

In addition, it is also possible that the measurements are carried out continuously, i.e. also in arbitrary (intermediate) rotary positions during a rotation, but at least in the two fixed (end) rotary positions.

The inertial measuring unit may in particular be configured to determine a heading.

According to an embodiment a rotary drive is provided that is configured to rotate the turntable between the rotary positions. The rotary drive may for example be an electro motor that can be driven by an according control. Driving is carried out in particular if the control of the motor receives a rotary control signal that has to trigger the rotation. Further, respective means are present that ensure that the rotation is carried out such as to cover exactly the predetermined angle (for example 180 degrees).

A method for operating one of the navigation devices as described above comprises the following steps:
 operating an inertial measuring unit arranged rotatable around an axis alternating in a first rotary position and in a second rotary position offset by e.g. 180 degrees;
 evaluating of measurement data of the inertial measuring unit and determining the quality of the measurement data;
 comparing the quality with a minimum quality;
 rotating the inertial measuring unit to the respective other rotary position always then if the determined quality does not reach the minimum quality.

Comparing the quality with the minimum quality can be carried out continuously. However, it is also possible to carry out the comparison after periodic time intervals.

Evaluating the measurement data and comparing the quality with the minimum quality is e.g. also possible during a rotation.

Figure 2:
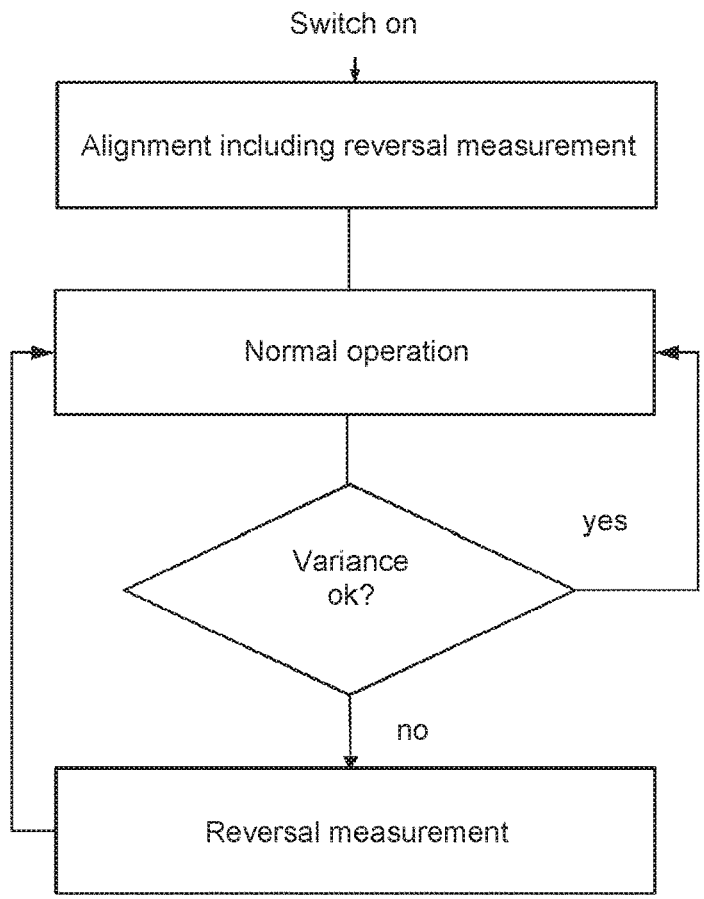

These and further advantages and features of the invention will be described in the following based on an example by using the accompanying figures. It shows:

FIG. 1 a top view onto a navigation device showing different positions of a turntable;

FIG. 2 a process diagram of the method of reversal measurement; and

Figure 3:
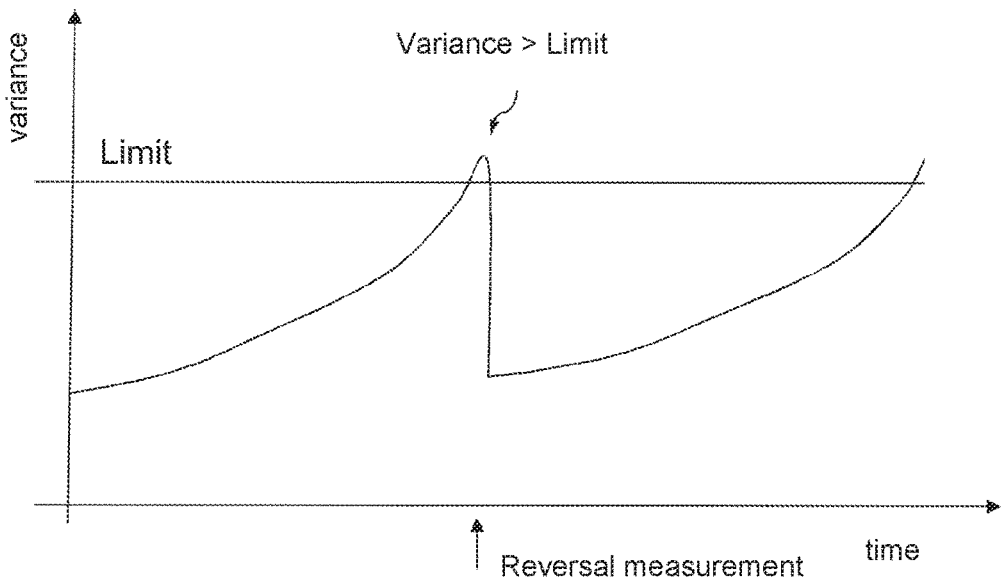

FIG. 3 a timing diagram showing the ratio of determined quality and a predetermined minimum quality.

FIG. 1 illustrates in a schematic top view a navigation device having a turntable 1 that carries an inertial measuring unit 2 and that can be rotated together with the inertial measuring unit 2 around an axis 3.

The inertial measuring unit 2 may e.g. be an MEMS measuring unit. The design of the MEMS measuring unit is known from the prior art such that a further description is not necessary.

By an arrow drawn on the turntable 1 the respective orientation of the turntable 1 can be recognized.

In FIG. 1a) the turntable 1 and the inertial measuring unit 2 are in a first position.

When a not illustrated rotary drive receives an according rotary drive signal for the reversal measurement, the rotation of the turntable 1 is triggered and the turntable 1 rotates together with the inertial measuring unit 2 (FIG. 1b) towards a rotary position that is offset by 180 degrees (FIG. 1c). Due to the changed direction of the arrow it can be recognized that the position of the turntable 1 in the FIGS. 1a and 1c is rotated with respect to each other by 180 degrees.

The rotation of the turntable 1 may in particular be triggered by a not illustrated evaluation unit of the inertial measuring unit 2. The evaluation unit monitors inter alia also the quality of the measurement signals of the inertial measuring unit 2 and can cause, for an insufficient quality, a rotation of the turntable 1 as will be described in the following.

In both of the predetermined rotary positions the envisaged measurement by the inertial measuring unit 2 is respectively carried out, and for example a bias (as typical measuring error) is determined. The measurements may, however, also be carried out in all other arbitrary rotary positions (e.g. also in the intermediate positions between the fixed end rotary positions) and/or also during a rotation.

FIG. 2 shows a block diagram of the process flow during the reversal measurement.

After switch on of the system an alignment of the inertial measuring unit is carried out that includes a reversal measurement for initializing the entire system.

Afterwards, normal operation including a per se well-known measurement by the inertial measuring unit is carried out.

Continuously or after predetermined time periods it is checked whether the variance of the measurement data supplied by the inertial measuring unit is in order ("ok"). This means that it is checked whether the variance as criterion for the quality of the measurement data is below a predetermined threshold (low variance means high quality)

or above (high variance means low quality). The threshold corresponds therefore to a threshold for the minimum quality.

If it is determined that the variance is alright, i.e. that the predetermined minimum quality is reached, normal operation is continued.

If, in contrast, it is determined that the variance is above the allowed threshold, i.e. that the quality of the measurement data is not sufficient anymore, a reversal measurement will be carried out. This means that a rotation of the turntable 1 is triggered as illustrated in FIG. 1. This rotation effects that the inertial measuring unit 2 is rotated by 180 degrees such that measurement errors, as for example the bias, act in opposite directions and compensate in this manner.

Monitoring of the variance can be carried out continuously or also after predetermined time intervals.

FIG. 3 illustrates a diagram showing the temporal changes of the variance.

At the beginning of the measurement, at steady state operation of the filter, the variance is low and increases slowly with time until a situation is reached in which the variance is higher than the predefined limit (the threshold value). In this case the predetermined minimum quality cannot be obtained any longer, which causes a reversal measurement as indicated in FIG. 3.

Thereafter, measurement starts anew now again with smaller variance that increases slowly until eventually it is again above the predetermined threshold.

The time periods between the single reversal measurements (rotations of the turntable 1) may, according to the conditions, be considerably longer than the time periods that are indicated in the prior art (in the prior art e.g. 2 to 10 minutes). Hence, rotations of the turntable 1 occur less often which reduces wearing.

If the system has already a considerable age, it is possible that due to wearing higher imprecisions arise. Then, rotations of the turntable 1 may be carried out also more often, i.e. for example after time periods of below 2 minutes.

In this manner reversal measurements according to present needs can be provided that adapt the measurement behavior to the respective technical, in particular mechanical, possibilities.

The invention claimed is:

1. A navigation device comprising
   a turntable rotated around an axis to at least two different rotary positions depending on a rotary control signal; and
   an inertial measuring unit arranged on the turntable and rotated with the turntable, the inertial measuring unit including:
   an evaluation unit for evaluating measurement data of the inertial measuring unit,
   wherein the evaluation unit detects a quality of the measurement data; and
   wherein if the quality of measurement data does not reach a predetermined minimum quality, the rotary control signal rotates the turntable to a respective other rotary position.

2. The navigation device according to claim 1, wherein the evaluation unit comprises a Kalman filter.

3. The navigation device according to claim 1, wherein the at least two different rotary positions are offset with respect to each other by an arbitrary angle of approximately 180 degrees.

4. The navigation device according to claim 1, wherein the quality of the measurement data can be determined based on a variance of the measurement data.

5. The navigation device according to claim 1, wherein the predetermined minimum quality
   is a predefined, fixed threshold; or
   is a dynamic threshold that can be changed by the evaluation unit depending on further conditions.

6. The navigation device according to claim 1, wherein the inertial measuring unit determines a heading.

7. The navigation device according to claim 1, wherein a rotary drive rotates the turntable between the at least two different rotary positions.

8. A method for operating the navigation device according to claim 1, comprising the steps:
   alternating the inertial measuring unit rotatably arranged around an axis between a first rotary position and a second rotary position;
   evaluating the measurement data of the inertial measuring unit;
   determining the quality of the measurement data;
   comparing the quality of the measurement data with the minimum quality; and
   rotating the inertial measuring unit to the respective other rotary position if the quality of the measurement data does not reach the minimum quality.

* * * * *